Jan. 15, 1935.  L. W. BARTOL  1,987,815
CABLE PULL RECORDING DEVICE
Filed June 22, 1931
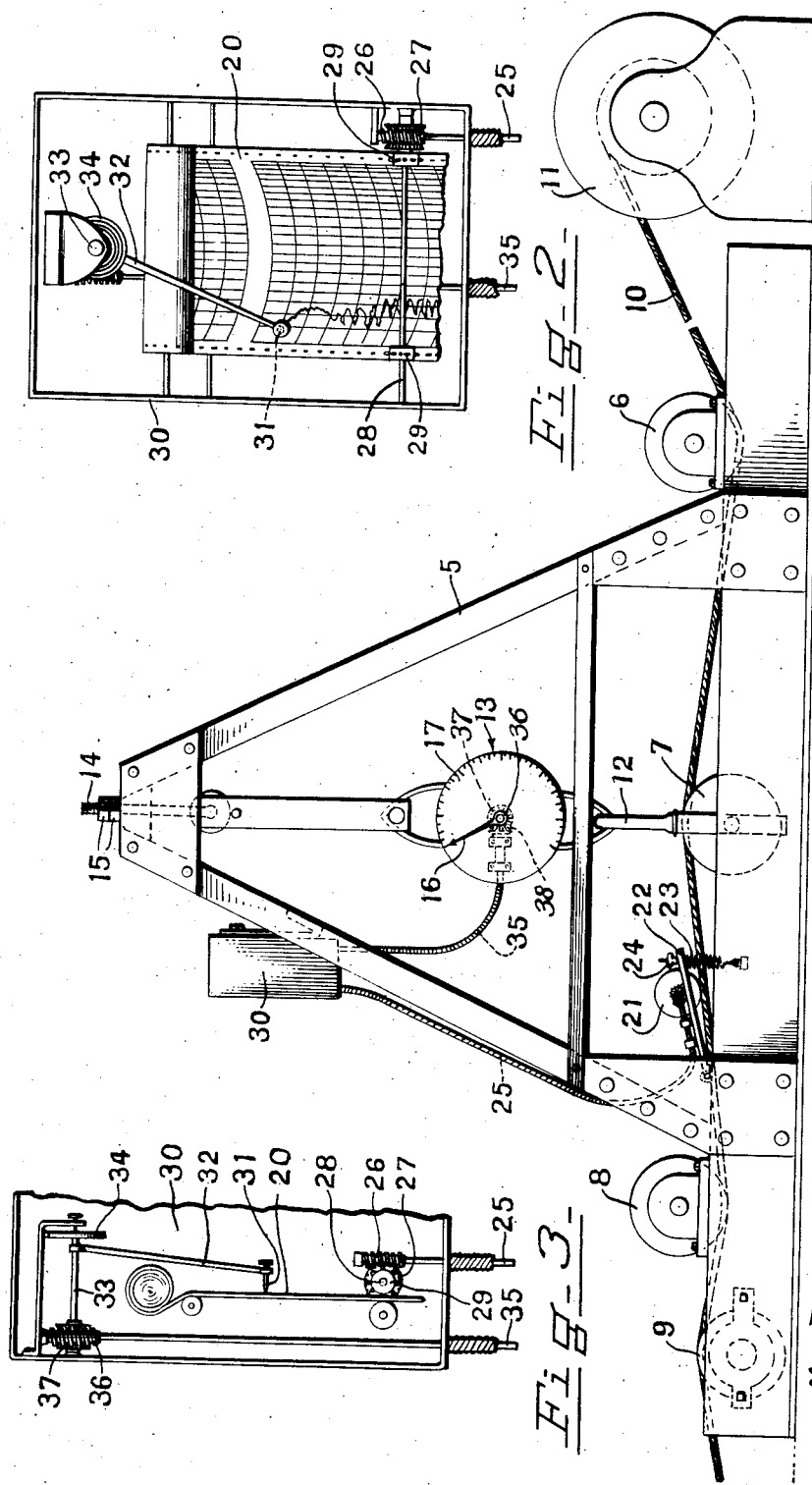
Inventor
L. W. Bartol Patented Jan. 15, 1935

1,987,815

UNITED STATES PATENT OFFICE 1,987,815

CABLE PULL RECORDING DEVICE

Louis W. Bartol, New York, N. Y.

Application June 22, 1931, Serial No. 545,991

6 Claims. (Cl. 265—2)

My invention relates to mechanism for indicating and/or recording the pull on a rope or cable.

One object of the invention is to provide simple and reliable mechanism for continuously recording the pull on a traveling cable.

Another object is to indicate changes in the pull or stress applied to a cable during hoisting operations and the like.

In carrying out the invention I provide a dynamometer or weighing device connected to the cable and capable of being calibrated according to any desired system or units of measurement. Preferably a recording strip, disc or cylinder is driven by the cable or by clock mechanism and receives the record of the pull.

Fig. 1 is a side view of apparatus embodying one form of my invention.

Fig. 2 is a front view of the recording apparatus.

Fig. 3 is a detail side view of the recording apparatus.

For convenience the mechanism is carried by a suitable frame 5 and is provided with a number of guide pulleys such as 6, 7, 8 and 9 for the cable 10. This cable may be wound on a drum 11 or power may be applied in any other suitable manner. The various pulleys may be mounted so as to permit them to move parallel to their axes so as to follow the cable. The pulleys 6, 8, etc. are mounted in bearings which preserve their vertical height and thus maintain the cable contacts in a definite plane.

The pulley 7 is carried by a yoke 12 suspended from a weighing scale or dynamometer 13. This weighing scale is supported directly or indirectly by an eye bolt 14 so that it may be adjusted up and down by suitable means such as nuts 15. The weighing device is provided with an indicator or pointer 16 which travels over a scale 17 which may be calibrated according to any desired system of measurement. Adjustment for calibration can be made by means of the nuts 15 at the top.

The record strip or sheet 20 of any suitable character is driven by suitable clock mechanism or by the cable itself. Such latter mechanism consists of a roller 21 which is carried by an arm 22 and pulled downward by a spring 23 against the cable. The pull of the spring may be adjusted by a thumb nut 24.

Flexible shaft 25 is driven by the roller 21 and in turn drives a worm 26 which meshes with a worm gear 27 on the shaft 28. This shaft has pin wheels 29 engaging the edges of the recording strip 20 for the purpose of feeding the same. The recording mechanism is mounted in a box 30 for protection and convenience.

The recording pen or pencil 31 is carried by an arm 32 which projects downwardly from the shaft 33. This arm may itself be resilient or otherwise biased toward the recording strip to maintain proper operating pressure of the pen or pencil. A spring 34 tends to move the arm toward one side or the other. The shaft 33 is rotated by a flexible shaft 35 geared at one end to the weighing device and geared at the other end through the worm 36 and worm wheel 37, which latter is on the shaft 33.

The weighing scale or dynamometer 13 may be of any well known spring scale type in which a pull on the load member 12 causes the rotation of a shaft 36 carrying an indicating hand 16 movable over a dial 17. On the shaft 36 is also carried a mitre gear 37 which coacts with a mitre gear 38 on the flexible shaft 35.

It will be apparent from the foregoing that the longitudinal pull on the cable 10 produces a vertical pull on the weighing device which is proportional thereto. Obviously the change of angle of the pull on the weighing device due to the movement up and down of the pulley 7 varies the angle through which the shaft of the weighing device is rotated and the dial 17 will be calibrated accordingly. As the pulley 7 moves up and down motion is transmitted through the flexible shaft 35 to the pen or other marking device 31 so that the pull on the cable is recorded on the strip 20.

In case the strip 20 is driven by the movement of the cable it is obvious that the chart will record the pull on the cable at any particular point in the length of the cable. In case the strip 20 is driven by a time-clock mechanism obviously the pull will be recorded according to a time scale rather than a cable length scale.

I also wish it understood that any type of chart may be employed, for instance, a conventional rotating disc or a rotating drum instead of the longitudinally movable strip.

As an illustration of one special use of this apparatus, I may mention its application to the checking of the condition of underground conduits such as electric light or telephone conduits. In such cases it is customary to first pull through the conduit a test cable and mandrel to see if the conduit is clear. Frequently an obstruction will be found which cannot be cleared by the drawing in of the mandrel and in such cases it is ordinarily necessary to break into the conduit at various points in order to locate the cause of trouble, thus involving not only great expense and annoyance but frequently prolonged delay which may interfere seriously with an entire installation. According to my invention, I run a pulling rope connected to the test cable through this apparatus.

A chart being provided, the marker records on the chart foot by foot the pull on the rope. When an obstruction is met, of course the increased resistance is immediately recorded on the chart. From this it can be seen at a glance exactly how many feet from the point of beginning the obstruction exists. In a recent test of such apparatus in connection with a test on a lighting conduit, the position of an obstruction was indicated 327 feet from the point of beginning. Upon inspection the obstruction was actually found within approximately one foot of the point indicated on the chart thus saving a great deal of time and expense.

I claim:

1. A cable stress recorder for a longitudinally moving cable, said recorder comprising two relatively fixed guide members for the cable, a guide pulley mounted to move between said guide members in a direction transversely to a line connecting the guide members and engaging the cable so as to be moved transversely of the cable as the tension on the cable varies, a weighing support for said cable guide pulley, a movable record chart, mechanism driven by the longitudinal movement of the cable and connected to said chart to drive the chart in proportion to the longitudinal movement of the cable, a marker coacting with said chart to form a record thereon, and mechanism connecting the weighing support and said marker for moving the marker proportionally to the variations in tension of the cable.

2. A recording cable pulling stress indicator for a longitudinally moving cable, said indicator comprising cable guides for said cable, a pulley coacting with the cable between said guides and moved by a transverse component of the stress in said cable, a frame, a weighing device on said frame having a rotatable shaft, means connecting said shaft and said pulley, a flexible shaft geared to said rotatable shaft, a marker driven by said flexible shaft, a wheel driven by the longitudinal movement of said cable, a second flexible shaft geared to said wheel and a record receiving member actuated by said second flexible shaft in contact with said marker.

3. A cable stress indicator for a longitudinally moving cable, said indicator comprising a frame, a marking member, a record receiving chart, a weighing device on said frame having a rotatable shaft, a gear on said shaft, a flexible shaft constituting a driving connection to said marking member and having a gear engaging said weighing device gear, a pulley coacting with said cable, means connecting said pulley and said rotatable shaft to move the marking member in proportion to the stress applied to the cable, a second flexible shaft operatively geared to said record receiving chart and having a gear, and a spring-pressed roller having a gear engaging said last mentioned gear, said roller engaging the cable for driving the chart at a speed proportional to the longitudinal travel of the cable.

4. A cable stress recorder comprising relatively stationary guide members for a longitudinally movable cable, a guide pulley mounted between said guide members and engaging the cable to be moved by the changes in tension on the cable, a weighing support for said guide pulley, a record chart, a roller rotated by the longitudinal movement of the cable, means of connection between said roller and said chart for driving the chart at a speed substantially proportional to the speed of the cable, a marker coacting with said chart, and means of connection between said weighing support and said marker for moving the marker proportionally to the movement of said weighing support and guide pulley.

5. A recording cable pulling stress indicator comprising a supporting frame, cable guide pulleys mounted at opposite ends of said frame, said pulleys being rotatable without moving the frame, a scale supported by an upper part of the frame, a roller connected to said scale and located between said guide pulleys, whereby said scale indicates tension on said cable, a recording mechanism including a marker connected to said scale, a recording surface, and means driven in synchronism with the longitudinal movement of said cable to move said recording surface with respect to said marker.

6. A cable pulling stress recording apparatus comprising a rigid framework having guide wheels mounted at opposite ends thereof, a tension weighing scale supported by an intermediate portion of the framework, a guide pulley supported by said scale and located between said guide wheels, a cable guided by said wheels and said pulley, whereby said scale may continuously measure the tension on said cable between the guide wheels as the cable is pulled over the guide pulley between the guide wheels, a recording mechanism including a marker connected and actuated by the weighing scale, a recording surface arranged to receive a record from the marker, a roller spring pressed against the cable and driven thereby, and a driving connection between said roller and the recording surface whereby the tension on the cable is continuously graphically recorded on the recording surface.

LOUIS W. BARTOL.